(12) United States Patent
Yamaguchi

(10) Patent No.: US 6,654,151 B1
(45) Date of Patent: Nov. 25, 2003

(54) IMAGE PROJECTOR

(75) Inventor: Kazuya Yamaguchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/597,490

(22) Filed: Jun. 19, 2000

(30) Foreign Application Priority Data

Jun. 25, 1999 (JP) .......................................... 11-179396
Jul. 29, 1999 (JP) .......................................... 11-214706
Dec. 17, 1999 (JP) .......................................... 11-359260

(51) Int. Cl.$^7$ ............................................. G02B 26/08
(52) U.S. Cl. .................... 359/196; 359/204; 359/216
(58) Field of Search ................................. 359/196, 197, 359/204, 205, 216, 217, 218; 347/232, 238, 243, 261; 385/1, 115, 116

(56) References Cited

U.S. PATENT DOCUMENTS 5,257,041 A * 10/1993 Kresock et al. .......... 346/107.4
5,684,620 A * 11/1997 Schoon ........................ 359/298
6,064,417 A * 5/2000 Harrigan et al. ............ 347/232
6,140,979 A * 10/2000 Gerhard et al. ............. 359/206
6,175,440 B1 * 1/2001 Conemac ..................... 359/204

FOREIGN PATENT DOCUMENTS

JP       7218857      8/1995
JP       9230499      9/1997

* cited by examiner

Primary Examiner—Euncha Cherry
(74) Attorney, Agent, or Firm—Stevens, Davis, Miller & Mosher, LLP

(57) ABSTRACT

In an image projector for forming a visible image on an object, a light beam projector projects a light beam, and a deflector changes frequently a proceeding direction of the projected light beam to change a position of a surface area on the object which surface area is to be irradiated by the projected light beam so that the irradiated surface area is moved rapidly and repeatedly over the object to form the visible image on the object.

3 Claims, 19 Drawing Sheets

LEFT END   PROJECTED IMAGE   RIGHT END

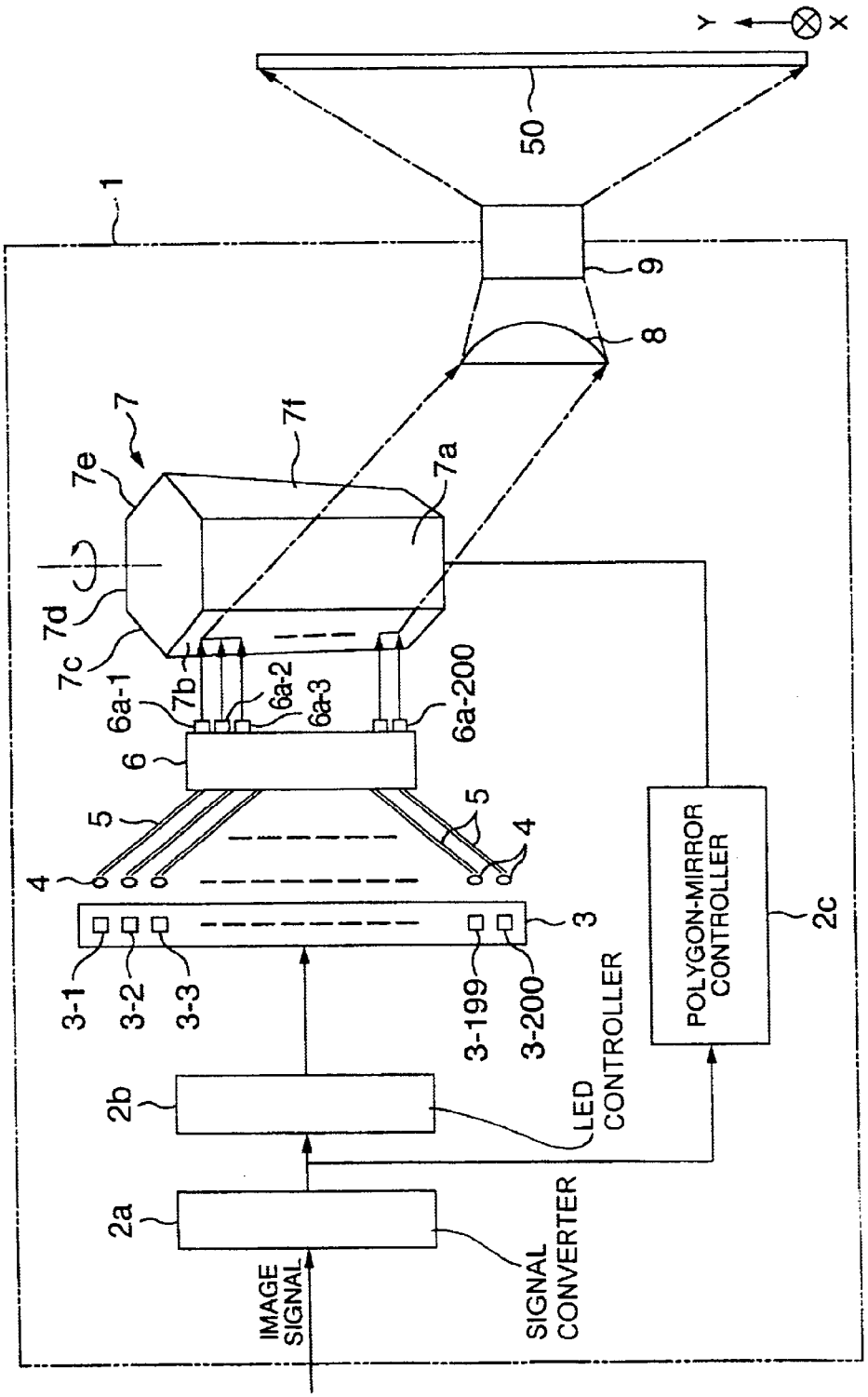

FIG.11
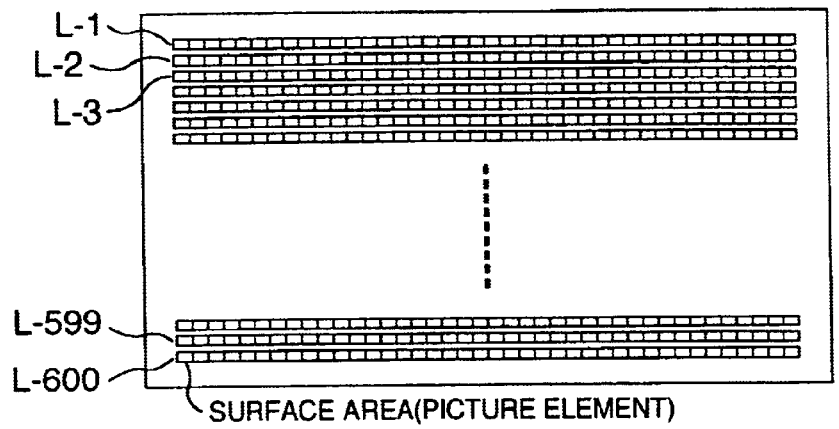
FIG.12a
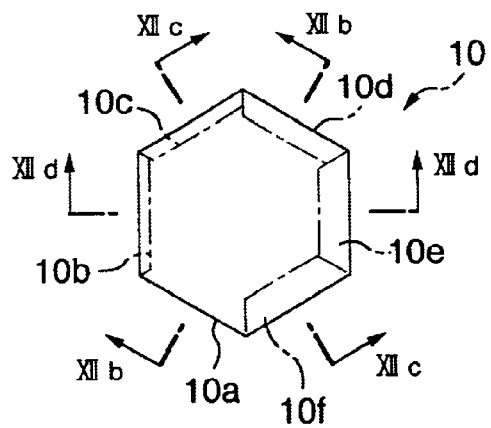
FIG.12b     FIG.12c     FIG.12d
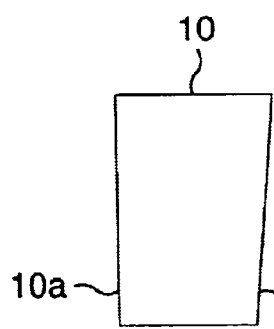 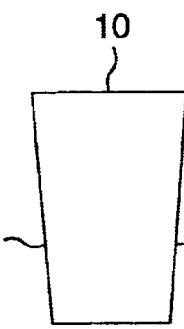 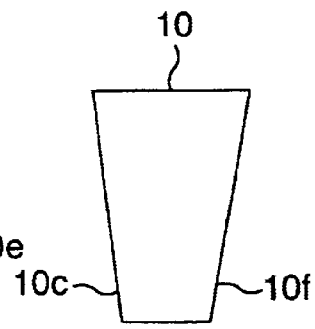

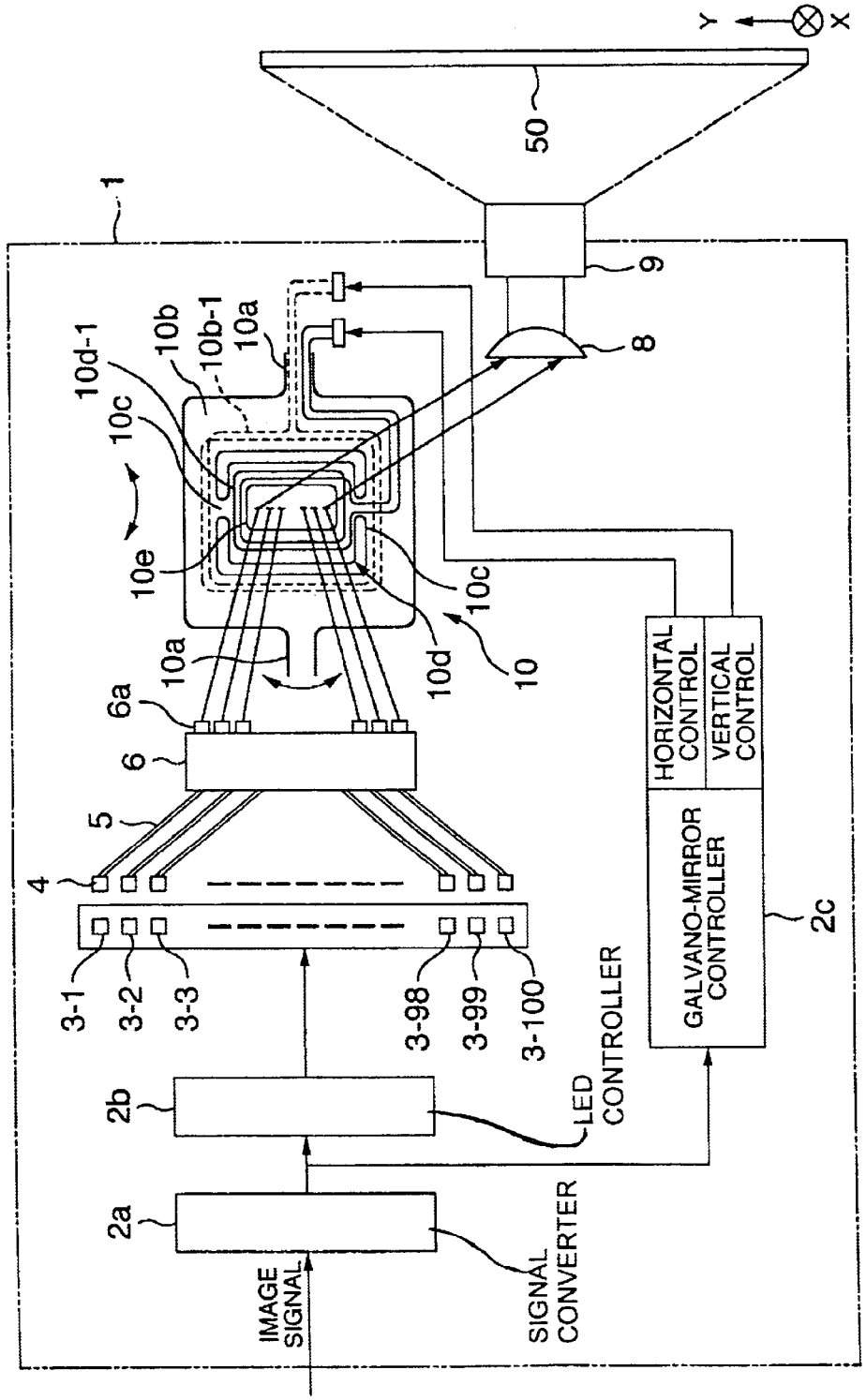

IMAGE PROJECTOR

BACKGROUND OF THE INVENTION AND RELATED ART STATEMENT

The present invention relates to an image projector or image forming method for projecting a light beam onto the object to form a visible image on the object.

In a prior art image projector as disclosed in JP-A-9-230499, a two-dimensional visible image is formed on an optically transparent plate including crystalline liquid, and the visible image is projected onto a screen by passing a light beam through the optically transparent plate toward the screen.

As a deflector for changing or deflecting a light beam proceeding direction, a galvano mirror as disclosed in JP-A-7-218857 is know publicly.

OBJECT AND SUMMARY OF THE INVENTION

An object of the present invention is to provide an image projector or image forming method for forming a visible image on an object, in which image projector or image forming method a number of light sources is significantly small, a two-dimensional visible image need not to be formed, and a large size and/or high resolution of the visible image on the object is obtained.

According to the present invention, an image projector for forming a visible image on an object, comprises, a light beam projector for projecting a light beam, and a deflector for changing frequently a proceeding direction in which the projected light beam proceeds to change a position of a surface area on the object which surface area is to be irradiated by the projected light beam so that the irradiated surface area is moved rapidly and repeatedly over the object to form the visible image on the object.

Since the proceeding direction is changed frequently to change the position of the surface area on the object which surface area is to be irradiated by the projected light beam so that the irradiated surface area is moved rapidly and repeatedly over the object to form the visible image on the object, a number of light sources for forming the visible image is significantly small, and a two-dimensional visible image need not to be formed before being projected onto the object while a large size and/or high resolution of the visible image on the object is obtained.

If the light beam includes at least two element light beams for respectively irradiating simultaneously the surface areas apart from each other, a frequency of the rapid and repeated movement of the irradiated surface area on the object is decreased. The element light beams may be arranged along an imaginary substantially straight line as seen in the proceeding direction in the light beam projector so that the light beam is long-and-narrow shaped as seen in the proceeding direction to irradiate simultaneously the surface areas apart from each other along the imaginary substantially straight line on the object as seen in the proceeding direction. If the surface areas along the imaginary substantially straight line are repeatedly moved on the object in a direction substantially perpendicular to the imaginary substantially straight line as seen in the proceeding direction so that the visible image is kept on the object, a band-shape of the visible image is formed rapidly on the object. If the surface areas along the imaginary substantially straight line are repeatedly shiftable on the object in a direction substantially parallel to the imaginary substantially straight line as seen in the proceeding direction so that the visible image is kept on the object, an elongated shape of the visible image is formed rapidly on the object. The element light beams along the imaginary substantially straight line may arranged exactly on the imaginary substantially straight line as seen in the proceeding direction or may be staggered relative to the imaginary substantially straight line as seen in the proceeding direction.

At least one of color and luminous intensity of the light of beam or at least one of the element light beams may changed in accordance with the movement of the surface area on the object, so that complex picture elements are formed in the visible image on the object.

The light beam projector comprises at least two light sources for generating respective color component light beams different from each other in color to be combined into the light beam or at least one of the element light beams, so that complexed colorful picture elements are formed in the visible image on the object.

If the light beam projector comprises a light source for generating the light beam, and an optical fiber connected to the light source to transmit the light beam from the light source toward the deflector, a positional relationship between the light source and the deflector may be freely set desirably by utilizing a flexibility of the optical fiber. If the light beam projector comprises at least two light sources for generating respective color component light beams different from each other in color to be combined into the light beam, and an optical fiber connected to each of the light sources to transmit the color component light beam from each of the light sources toward the deflector, a positional relationship between each of the light sources and the deflector may be freely set desirably by utilizing a flexibility of the optical fiber.

If the surface areas along the imaginary substantially straight line are moved on the object in a direction substantially perpendicular to the imaginary substantially straight line on the object as seen in the proceeding direction, and subsequently, the surface areas along the imaginary substantially straight line are moved again on the object in the direction substantially perpendicular to the imaginary substantially straight line on the object as seen in the proceeding direction after the surface areas along the imaginary substantially straight line are moved on the object in a direction substantially parallel to the imaginary substantially straight line on the object as seen in the proceeding direction, so that the visible image is formed by stacking sequentially in the direction substantially parallel to the imaginary substantially straight line the visible image formed by the simultaneously irradiated surface areas along the imaginary substantially straight line moved rapidly in the direction substantially perpendicular to the imaginary substantially straight line, the visible image of large size and high resolution is obtained on the object without a large number of light sources and a two-dimensional visible image formed before projected onto the object.

The light beam may include an incoherent light beam. The light beam projector may comprise at least one of organic electro-luminescent element and light emitting diode for generating the light beam.

The deflector may include a rotatable mirror arranged to receive the light beam so that the proceeding direction is changed frequently. The rotatable mirror may be rotatable continuously in a rotational direction on an rotational axis or swingable in directions opposite to each other to reciprocate circumferentially. The rotatable mirror may include a plurality of rotatable element mirrors arranged distributively around the rotational axis to receive respectively the light beam.

If the light beam is prevented from being projected toward the object when the surface areas along the imaginary substantially straight line is shifted relatively largely on the object in a direction substantially parallel to the imaginary substantially straight line on the object as seen in the proceeding direction, and the light beam is projected toward the object when the positions of the surface areas along the imaginary substantially straight line are kept substantially constant (including shifted slightly) on the object in the direction substantially parallel to the imaginary substantially straight line on the object as seen in the proceeding direction, a clearness of the visible image on the object is maintained or is prevented from being deteriorated by an interference between the irradiated and shifted surface areas along the imaginary substantially straight line. If the light beam is projected toward the object when the positions of the surface areas along the imaginary substantially straight line are kept substantially constant (including shifted slightly) on the object in the direction substantially parallel to the imaginary substantially straight line on the object as seen in the proceeding direction while the positions of the surface areas along the imaginary substantially straight line are changed on the object in a direction substantially perpendicular to the imaginary substantially straight line on the object as seen in the proceeding direction, a clearness of each of the picture elements formed by the surface areas along the imaginary substantially straight line is kept without the interference between the irradiated and shifted surface areas along the imaginary substantially straight line.

If the light beam is prevented from being projected toward the object when the rotatable mirror is swung in one of the directions opposite to each other, and the light beam is projected toward the object when the rotatable mirror is swung in another one of the directions opposite to each other, a control for energizing the light beam projector and/or driving the deflector is simplified to keep the clearness of the visible image.

If the light beam is prevented from being projected toward the object when the proceeding direction is directed toward a boundary or corner between the element mirrors circumferentially adjacent to each other, the visible image is prevented from being deteriorated by the light beam reflected irregularly by the boundary or corner between the element mirrors.

If the surface area is shiftable on the object in directions opposite to each other or substantially perpendicular to each other, the light beam is projected toward the object when the surface area is shifted on the object in one of the directions, and the light beam is prevented from being projected toward the object when the surface area is shifted on the object in another one of the directions, a control for energizing the light beam projector and/or driving the deflector is simplified.

It is preferable that the element light beams proceed substantially parallel to each other between the light beam projector and the deflector or when the element light beams are received by the deflector. It is preferable that the element light beams simultaneously proceeding from the deflector toward the object are substantially parallel to each other.

If the light beam or at least one of the element light beams is projected from the light beam projector toward the deflector after the color component light beams different from each other in color are mixed with each other to form or be combined into the light beam or the at least one of the element light beams, a relative displacement between color components in each of the picture elements is prevented so that a color is even over the whole of the each of the picture elements.

BRIEF DESCRIPTION OF THE DRAWINGS

FIG. 6 is a schematic view showing main elements of another image projector as a second embodiment of the invention.

FIG. 11 is a schematic view showing a visible image formed by changing a horizontal position of surface areas on the object which surface areas are irradiated by respective element light beams.

FIG. 12a is a cross sectional view of a polygon mirror taken along an imaginary plane perpendicular to a rotational axis of the polygon mirror.

FIG. 12b is a cross sectional view of a polygon mirror taken along an imaginary plane XIIb—XIIb including the rotational axis of the polygon mirror.

FIG. 12c is a cross sectional view of a polygon mirror taken along an imaginary plane XIIc—XIIc including the rotational axis of the polygon mirror.

FIG. 12d is a cross sectional view of a polygon mirror taken along an imaginary plane XIId—XIId including the rotational axis of the polygon mirror.

FIG. 23 is a schematic view showing main elements of another image projector as a fourth embodiment of the invention.

DETAILED DESCRIPTION OF PREFERRED EMBODIMENTS

First embodiment

Figure 1:
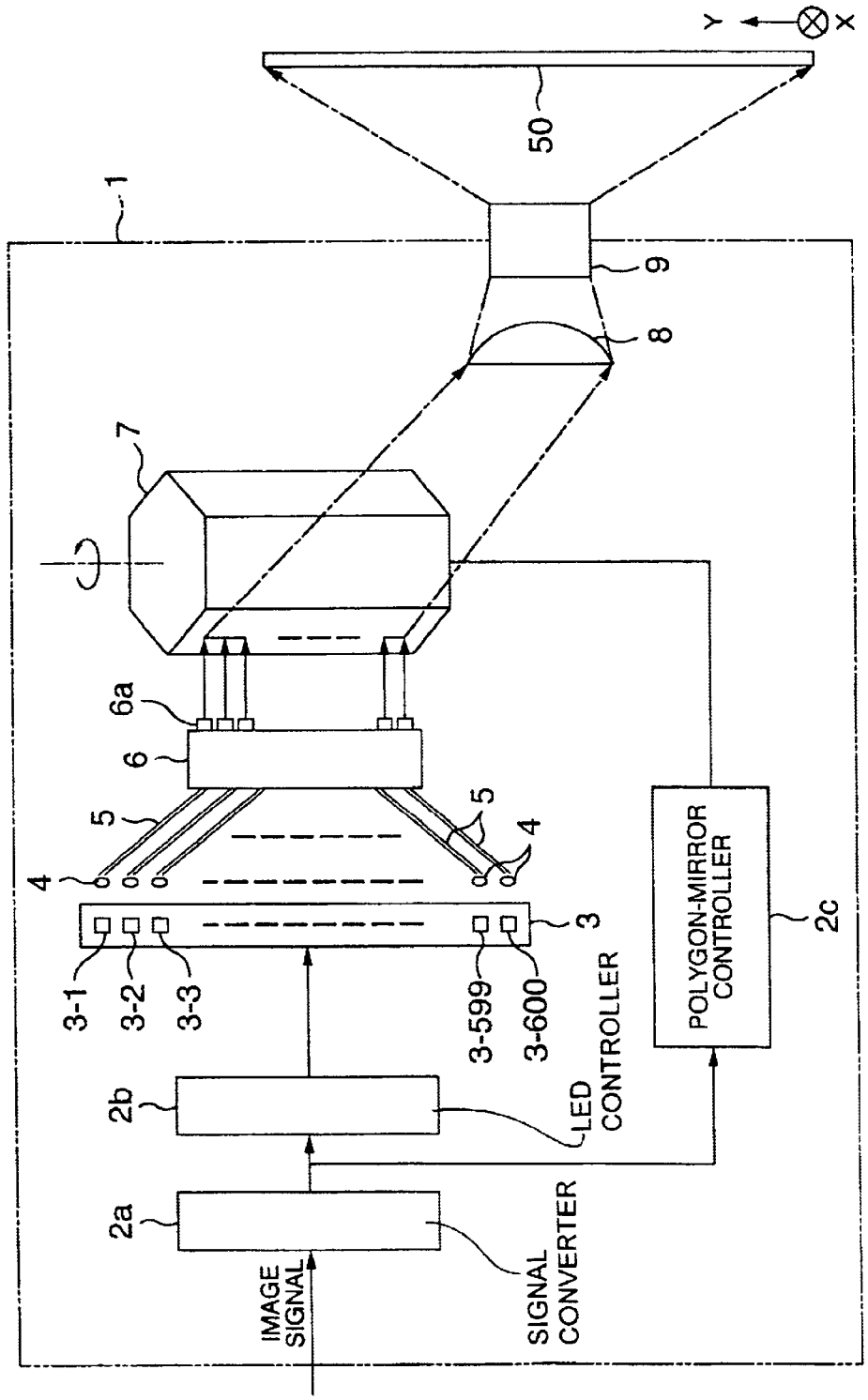
FIG. 1 is a schematic view showing main elements of an image projector as a first embodiment of the invention.

As shown in FIG. 1, an image projector 1 for projecting a visible image (a number of horizontal picture elements is, for example, 800, and a number of vertical picture elements is, for example, 600) onto a screen 50, has a signal converter 2a for converting input image signals to output picture element control signals with A/D conversion and signal synchronization, a light emitting diode (LED) controller 2b for converting the picture element control signals into LED driving signals including a red light emitting LED driving signal, a green light emitting LED driving signal and a blue light emitting LED driving signal with γ compensation and gradation control, a polygon mirror controller 2c for controlling a rotational position of a polygon mirror 7 to synchronize with a light beam, and an optical system.

The optical system includes an LED array 3, focussing lens 4 for introducing lights into respective optical fibers 5, a light beam projector 6 for combining the red, green and blue lights into each element light beam and projecting a light beam including the element light beams, the polygon mirror 7 for changing frequently a proceeding direction of the projected light beam, a distortion compensating lens 8 and a projection lens 9. By this image projector 1, the visible image including 600 vertical picture elements and 800 horizontal picture elements is projected on the screen 50 by 60 times per each second to form a moving picture.

Figure 2:
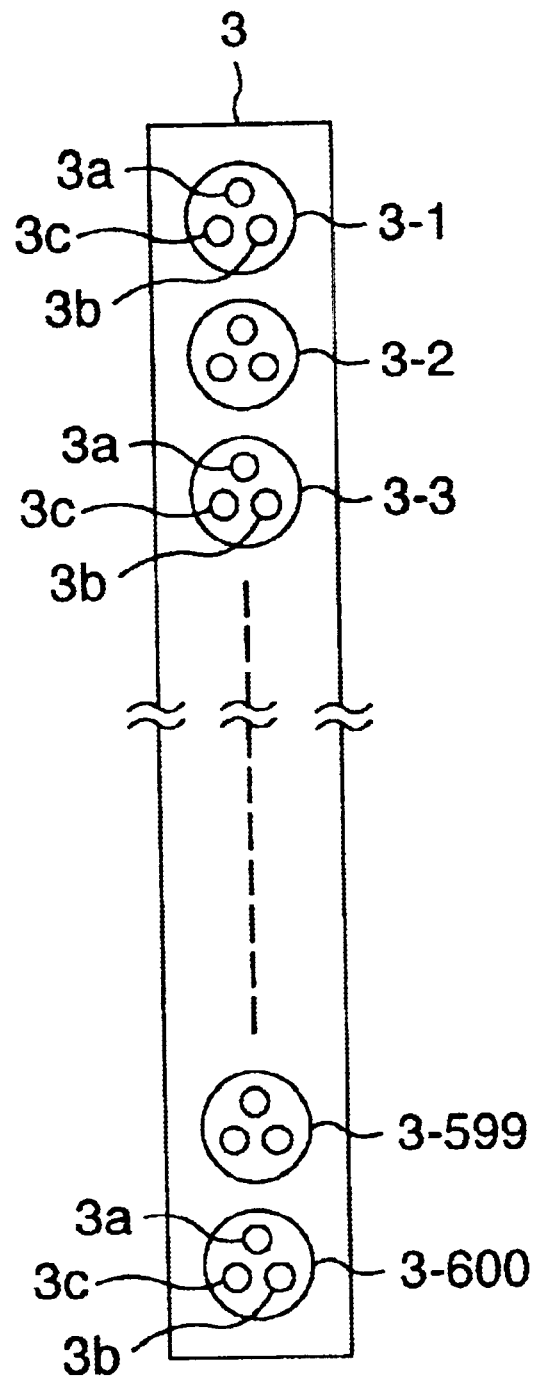
FIG. 2 is a schematic front view showing a light source unit usable in the image projector.

The LED array 3 contains 600 LED sets 3-1–3-600 each having a red light emitting LED 3a, a green light emitting LED 3b and a blue light emitting LED 3c. Another color light emitting LED may be incorporated into each of the LED sets. The 600 LED sets are arranged along an imaginary substantially straight line as shown in FIG. 2. The LED array 3 may contain 600 LED of a single color instead of a multi-color LED sets.

Figure 3A:
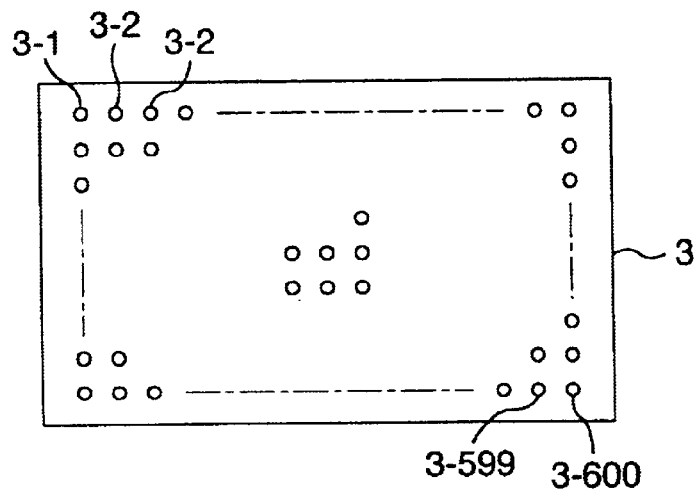
FIG. 3a is a schematic front view showing another light source unit usable in the image projector.
Figure 3B:
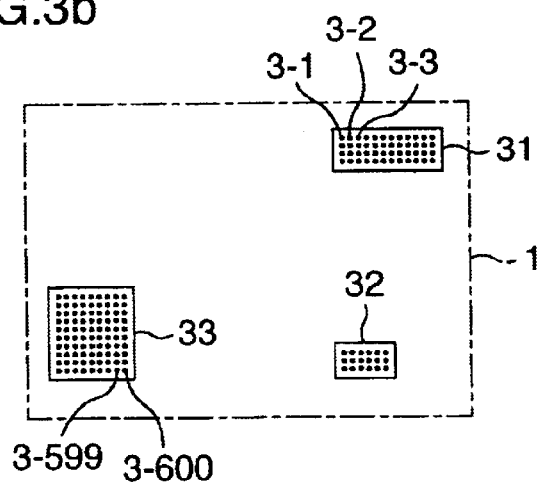
FIG. 3b is a schematic front view showing another light source unit usable in the image projector.

The focussing lens 4 aligned with the LED sets 3-1–3-600 focus the lights of multi-color generated by the LED sets 3-1–3-600 into the optical fibers 5 to introduce the element light beams into the light beam projector 6 so that the lights each generated by the red light emitting LED 3a, the green light emitting LED 3b and/or the blue light emitting LED 3c and combined into the element light beams are effectively supplied to the light beam projector 6. The light beam projector 6 has projection lens 6a for projecting the element light beams correctly parallel to each other toward the polygon mirror 7 from the light beam projector 6. The optical fibers 5 enable the LED array 3 including light sources 3-1–3-600 to be freely arranged relative to the light beam projector 6 while the lights combined into the element light beams are effectively supplied to the light beam projector 6. The LED array 3 may be shaped as shown in FIG. 3a or FIG. 3b.

Figure 4:
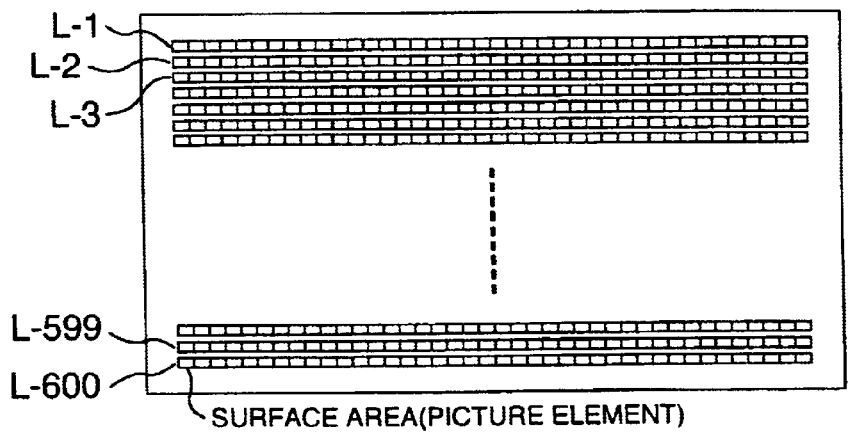
FIG. 4 is a schematic view showing a visible image formed by changing a horizontal position of surface areas on the object which surface areas are irradiated by respective element light beams.

The polygon mirror 7 rotates to change frequently the proceeding direction including the element light beams correctly parallel to each other. The distortion compensating lens 8 guides the light beam projected from the light beam projector 6 and deflected by the polygon mirror 7 to the projection lens 9. The projection lens 9 expands and projects the light beam varied in accordance with the image signals and reflected by the polygon mirror 7 to form the visible image on the screen 50 as shown in FIG. 4.

If terminating ends of the optical fibers 5 are shaped to perform as the projection lens 6a, the projection lens 6a are not necessary.

In order to generate the 800 horizontal picture elements by 60 times per each second for forming finely the moving picture, at least one of color and luminous intensity of the element light beam needs to change by 48000 (800*60) times per each second. When the polygon mirror 7 has six element mirrors, in order to generate the 800 horizontal picture elements by 60 times per each second, the polygon mirror 7 needs to rotate by 10 revolutions per each second.

The LED controller 2b and the polygon mirror controller 2c cooperate with each other in such a manner that the element light beams are prevented from being projected from the light beam projector 6 when a proceeding direction of the element light beams is directed to a corner of the polygon mirror 7 between the element mirrors circumferentially adjacent to each other.

Figure 5A:
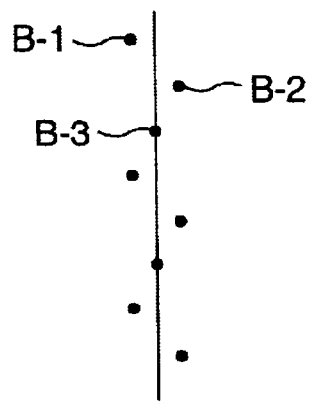
FIG. 5a is a schematic view showing an arrangement of the element light beams as seen in a proceeding direction of a light beam.
Figure 5B:
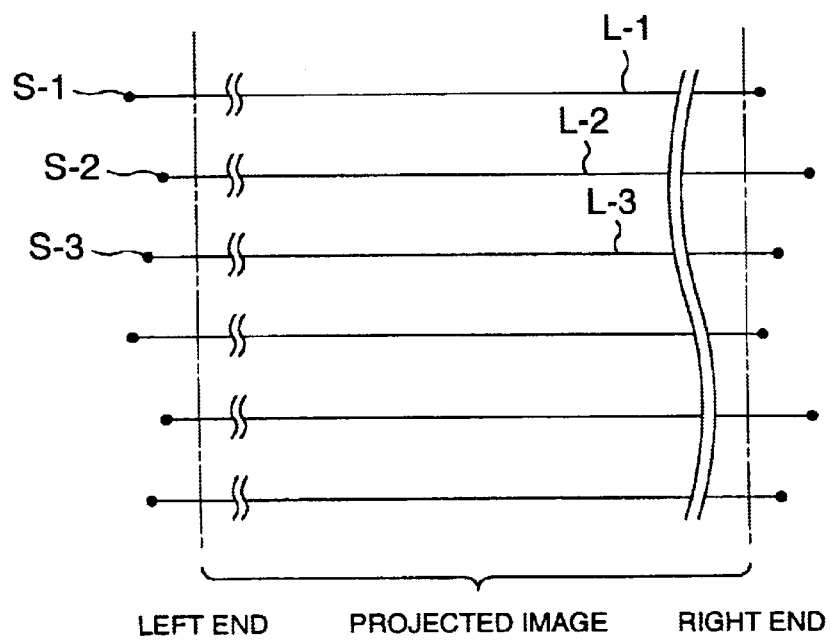
FIG. 5b is a schematic view showing the visible image formed by the arrangement of the element light beams of FIG. 5a without adjusting switching on-and-off timings of the element light beams to align the surface. areas on an imaginary straight line on the object.
Figure 7A:
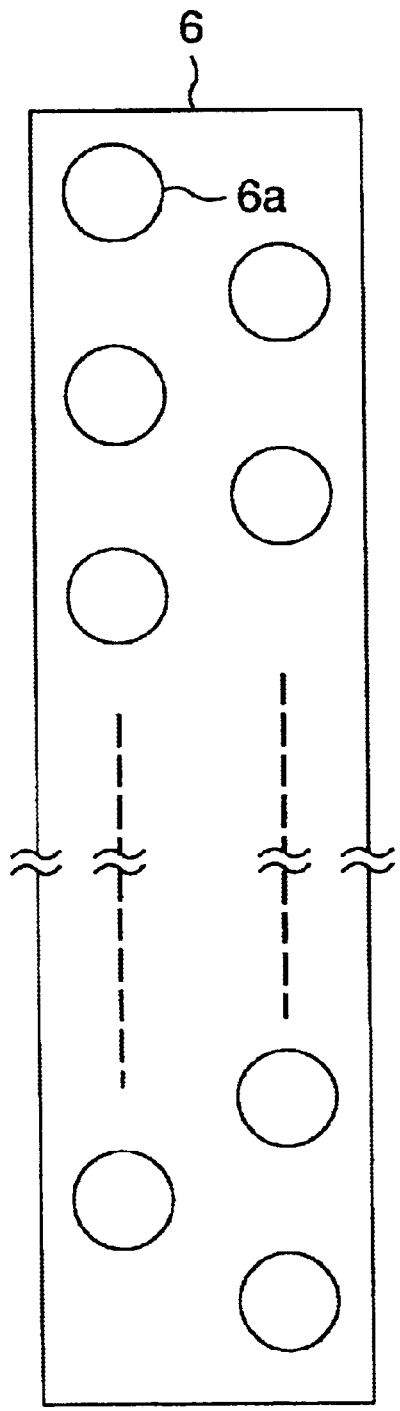
FIGS. 7a and 7b are schematic front view showing another light source unit usable in the image projector.
Figure 7B:
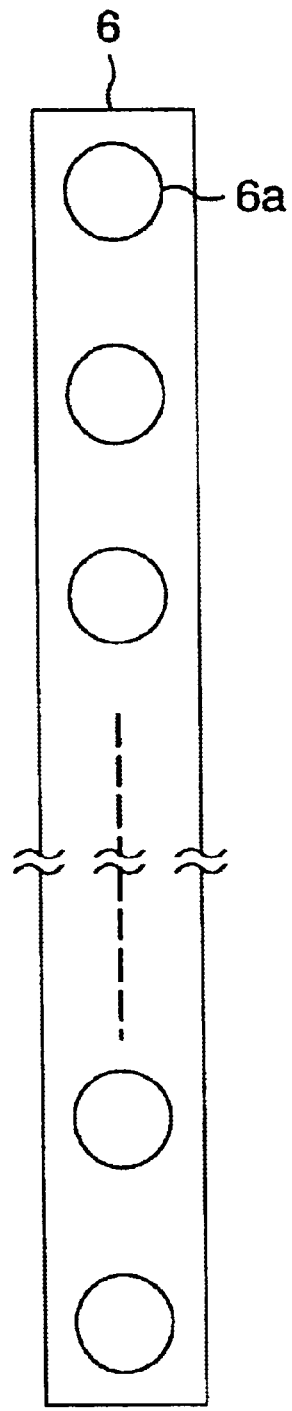
Figure 8A:
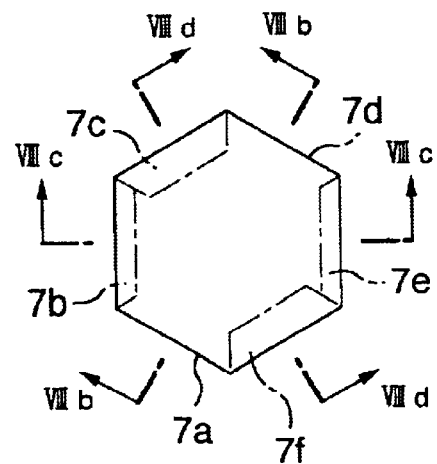
FIG. 8a is a cross sectional view of a polygon mirror taken along an imaginary plane perpendicular to a rotational axis of the polygon mirror.
Figure 8B:
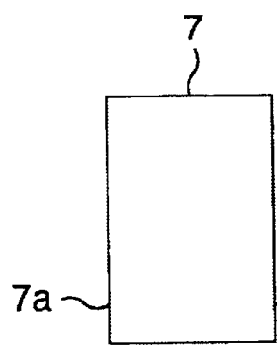
FIG. 8b is a cross sectional view of a polygon mirror taken along an imaginary plane VIIIb—VIIIb including the rotational axis of the polygon mirror.
Figure 8C:
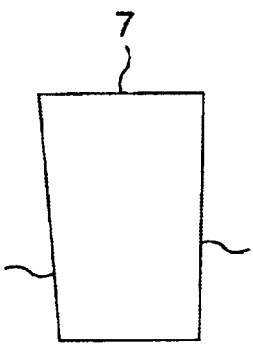
FIG. 8c is a cross sectional view of a polygon mirror taken along an imaginary plane VIIIc—VIIIc including the rotational axis of the polygon mirror.
Figure 8D:
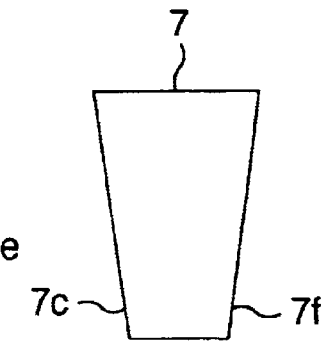
FIG. 8d is a cross sectional view of a polygon mirror taken along an imaginary plane VIIId—VIIId including the rotational axis of the polygon mirror.

Instead of the light beam projector 6 including the projection lens 6a arranged on an imaginary substantially straight line as seen in the proceeding direction as shown in FIG. 7b, the light beam projector 6 including the projection lens 6a staggered relative to the imaginary substantially straight line as seen in the proceeding direction as shown in FIG. 7a may project the element light beams staggered relative the imaginary substantially straight line as seen in the proceeding direction as shown in FIG. 5a. By the staggered element light beams B-1–B-600, a horizontal end of the visible image formed by horizontal end picture elements S-1–S-600 on respective horizontal picture element array L-1–L-600 on the object is not straight as shown in FIG. 5b. However, if the switching on and off timings of the element light beams projected from the staggered projection lens 6a, that is, the horizontal positions of the picture elements S-1–S-600 formed by the element light beams switched on and off and moved or deflected horizontally, are respectively adjusted to compensate fixed horizontal positional differences between the element light beams projected from the staggered projection lens 6a, the horizontal end of the visible image formed by the horizontal end picture elements S-1–S-600 can be set substantially straight.

The polygon mirror 7 may be replaced by a prism of electro-optical crystalline as the deflector for deflecting the proceeding direction so that the horizontal picture elements are formed by the movement of the light beam. The prism of electro-optical crystalline may operate also as the distortion compensating lens 8 while the distortion compensating lens 8 and the deflector are combined with each other.

Second embodiment

In a second embodiment of the invention as shown in FIG. 6, the polygon mirror 7 has a pair of element mirror sets 7a–c and 7d–f in each of which element mirror sets inclination angles of the element mirrors relative to a rotational axis of the polygon mirror 7 are changed in a circumferential direction of the polygon mirror 7 to deflect the proceeding direction vertically, that is, in a direction parallel to the imaginary substantially straight line as seen in the proceeding direction, as shown in FIGS. 8a–d.

Figure 9:
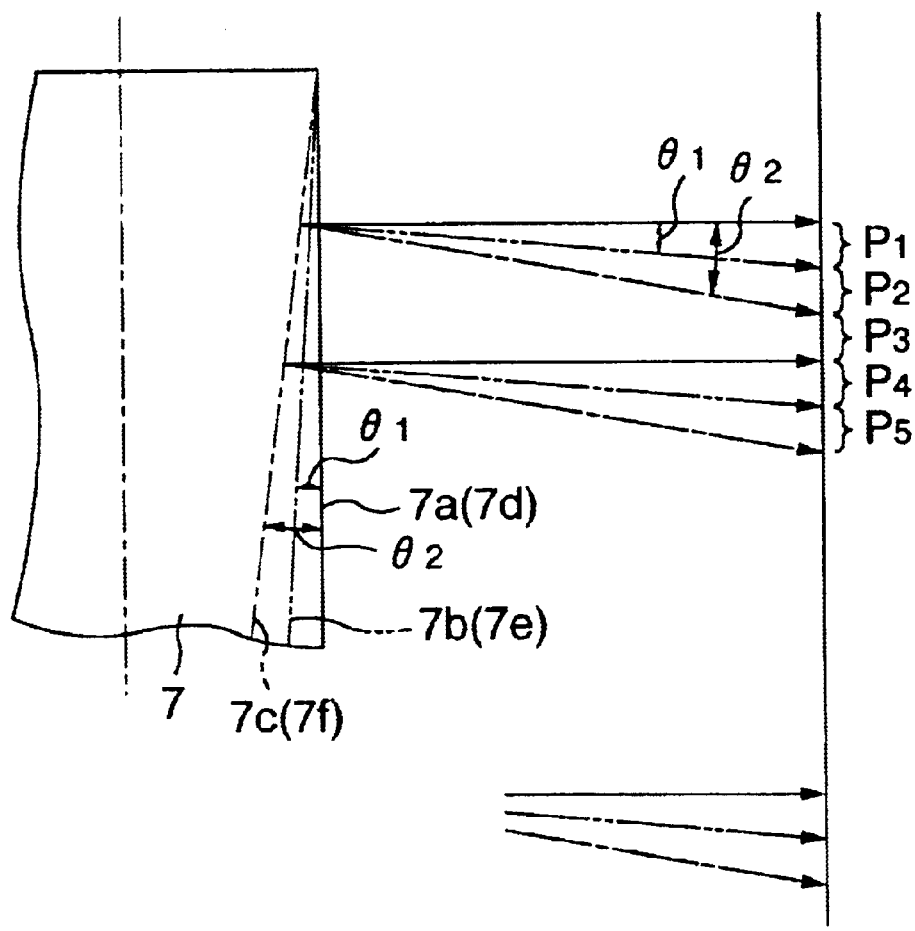
FIG. 9 is a schematic view showing a relationship between an inclination degree of an element mirror of the polygon mirror and a position of a surface area irradiated by the light beam.

The change of the inclination angles of the element mirrors relative to the rotational axis of the polygon mirror 7 in accordance with a proceeding of the rotation of the polygon mirror 7 causes a vertical shift of the 800 horizontal picture elements as shown in FIG. 9. For example, vertical first one of the element light beams forms three vertically juxtaposed arrays of the 800 horizontal picture elements L-1–L-3. The inclination angles of the element mirrors θ are determined to keep vertical distances P1, P2 between the three vertically juxtaposed arrays of the 800 horizontal picture elements L-1–L-3 equal to each other, and a vertical distance P3 between the horizontal picture elements adjacent to each other formed by the element light beams adjacent to each other vertically in the light beam projector 6 equal to the vertical distances P1. P2. Therefore, a number of the element light beams to be arranged vertically along the imaginary substantially straight line in the light beam projector 6 and a number of the LED light sets as the claimed light sources to form 600 vertical arrays L-1–L-600 of the 800 horizontal picture elements as shown in FIG. 11 may be 200.

Figure 10A:
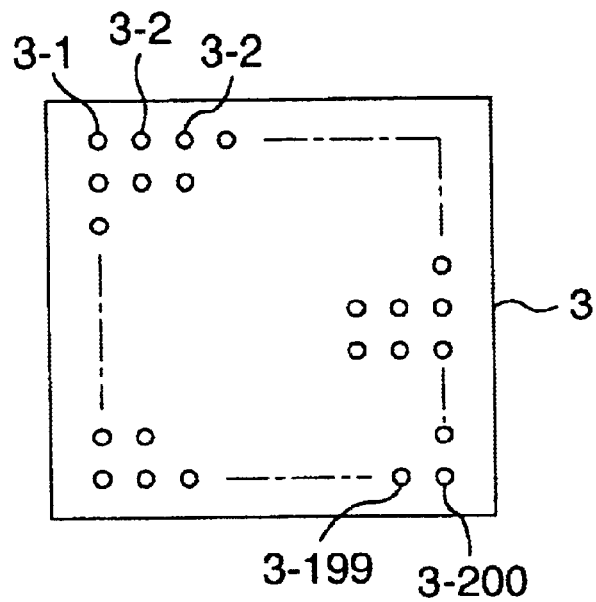
FIG. 10a is a schematic front view showing another light source unit usable in the image projector.
Figure 10B:
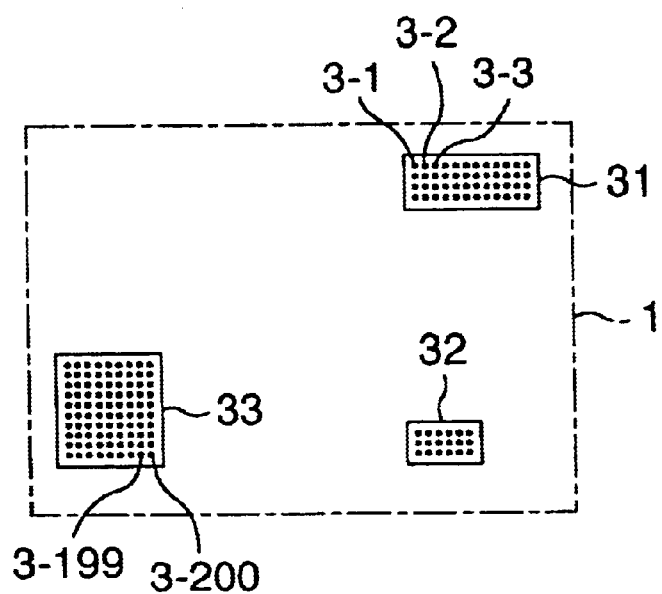
FIG. 10b is a schematic front view showing another light source unit usable in the image projector.
Figure 13A:
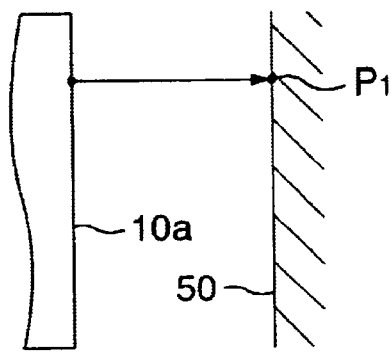
FIGS. 13a–13f are schematic views each showing a relationship between an inclination degree of an element mirror of the polygon mirror and a position of a surface area irradiated by the light beam.
Figure 13B:
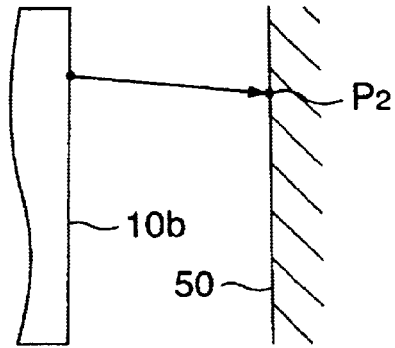
Figure 13C:
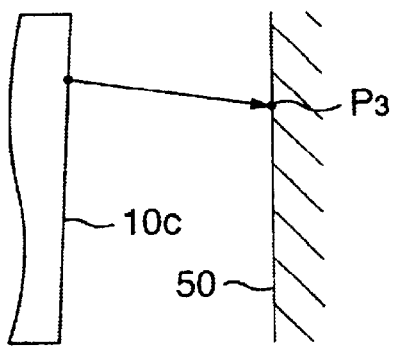
Figure 13D:
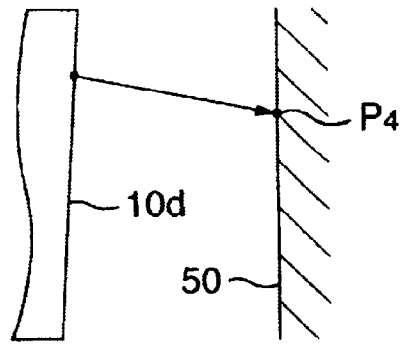
Figure 13E:
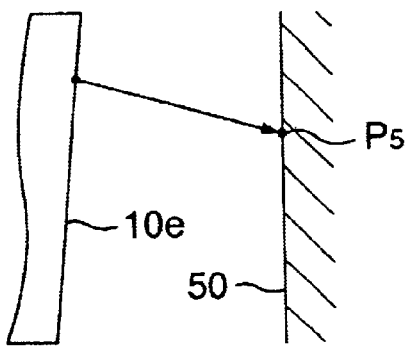
Figure 13F:
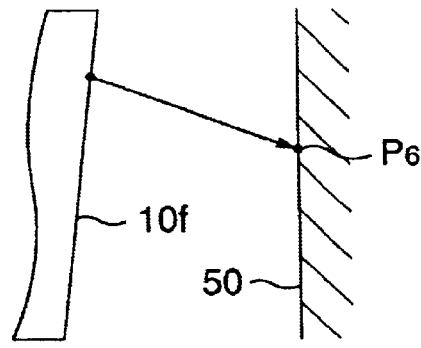

The optical fibers 5 enable the LED array 3 including the light sources or LED sets 3-1–3-600 to be freely arranged relative to the light beam projector 6 while the element light beams are effectively supplied to the light beam projector 6. The LED array 3 may be shaped as shown in FIG. 10a or FIG. 10b.

In order to generate the 800 horizontal picture elements by 60 times per each second for forming finely the moving picture while each of the element light beams forms three vertically juxtaposed arrays of the 800 horizontal picture elements, at least one of color and luminous intensity of the element light beam needs to change by 144000 (800*60*3) times per each second. When the polygon mirror 7 has two set of three element mirrors, in order to generate the 800 horizontal picture elements by 60 times per each second, the polygon mirror 7 needs to rotate by 30 revolutions per each second.

A combination of a blue light emitting LED of nitride compound semiconductor, a green light emitting LED of nitride compound semiconductor and a red light emitting LED of Al—Ga—In—P compound semiconductor enables the visible image on the object to have a high-luminous intensity.

The polygon mirror 7 may have six element mirrors whose inclination angles relative to the rotational axis of the polygon mirror 7 are changed in the circumferential direction of the polygon mirror 7 as shown in FIGS. 12a–d to deflect the proceeding direction vertically, that is, in the direction parallel to the imaginary substantially straight line as seen in the proceeding direction, as shown in FIGS. 13a–f.

The change of the inclination angles of the element mirrors relative to the rotational axis of the polygon mirror 7 in accordance with the proceeding of the rotation of the polygon mirror 7 causes a vertical shift of the 800 horizontal picture elements as shown in FIGS. 13a–f. One of the element light beams forms six vertically juxtaposed arrays of the 800 horizontal picture elements. The inclination angles of the element mirrors θ are determined to keep vertical distances between vertically juxtaposed arrays of the 800 horizontal picture elements formed by the one of the element light beams equal to each other, and a vertical distance between the horizontal picture elements adjacent to each other formed respectively by the element light beams adjacent to each other vertically in the light beam projector 6 equal to the vertical distances between the vertically juxtaposed arrays of the 800 horizontal picture elements formed by the one of the element light beams. Therefore, a number of the element light beams to be arranged vertically along the imaginary substantially straight line in the light beam projector 6 and a number of the LED light sets as the claimed light sources to form the 600 vertical arrays of the 800 horizontal picture elements may be 100.

In order to generate the 800 horizontal picture elements by 60 times per each second for forming finely the moving picture while each of the element light beams forms six vertically juxtaposed arrays of the 800 horizontal picture elements, at least one of color and luminous intensity of the element light beam needs to change by 288000 (800*60*6) times per each second. When the polygon mirror 7 has six element mirrors, in order to generate the 800 horizontal picture elements by 60 times per each second, the polygon mirror 7 needs to rotate by 60 revolutions per each second.

Figure 14:
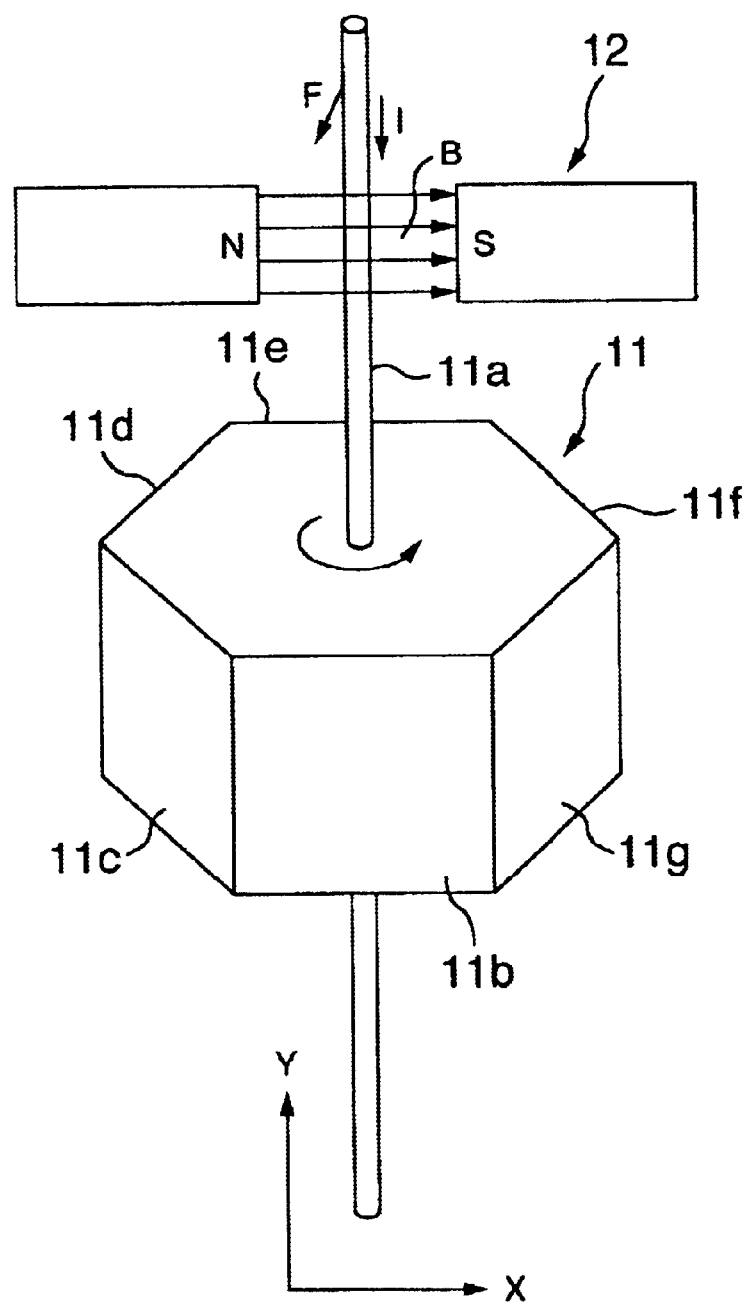
FIG. 14 is a schematic view showing another polygon mirror usable in the image projector.
Figure 15:
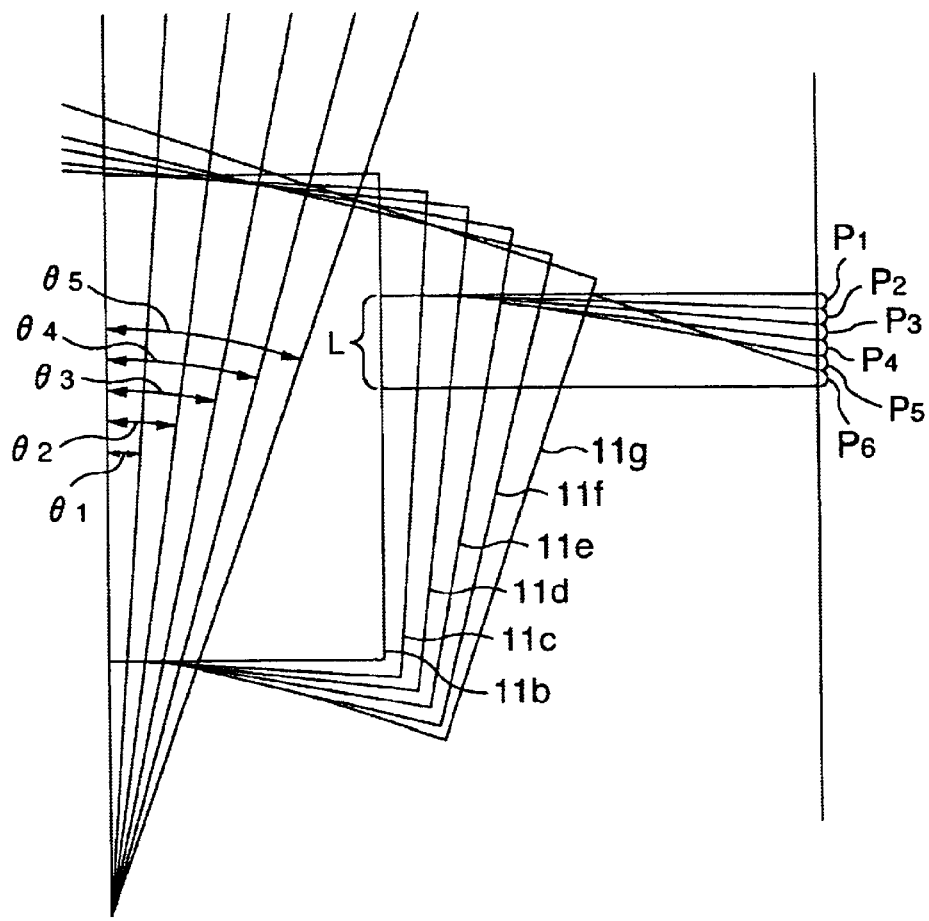
FIG. 15 is a schematic view showing a relationship between an inclination degree of an element mirror of the another polygon mirror of FIG. 14 and a position of a surface area irradiated by the light beam.
Figure 16:
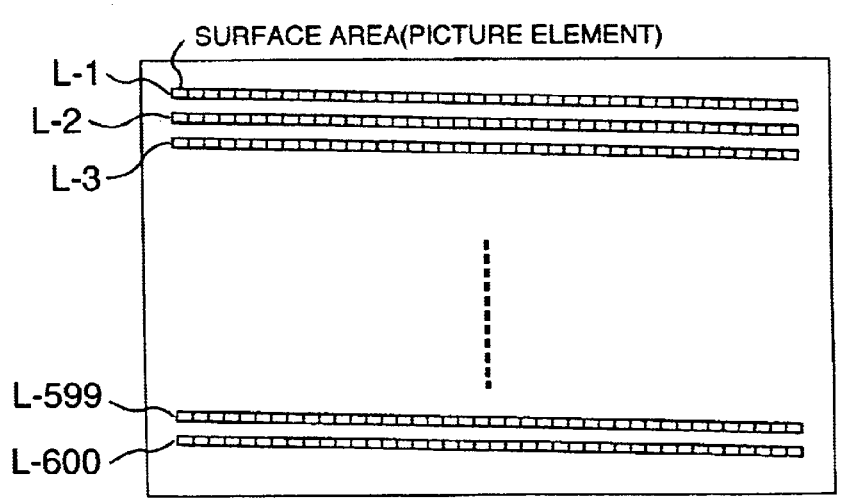
FIG. 16 is a schematic view showing a visible image formed by changing horizontal and vertical positions of surface areas on the object which surface areas are irradiated by respective element light beams.

A polygon mirror 11 including element mirrors 11b–g extending parallel to a rotational axis thereof and rotatable on a swingable shaft 11a as shown in FIG. 14 may be used instead of the polygon mirror 7. An angular position of the swingable shaft 11a is adjusted by a Lorentz force F generated by applying controllably an axial electric current I to the shaft 11a and forming a magnetic field B transversing the shaft 11a between a permanent magnet 12, so that the change of the inclination angles of the element mirrors 11b–g relative to a basic rotational axis of the polygon mirror 11 in accordance with the proceeding of the rotation of the polygon mirror 11 causes a vertical shift of the 800 horizontal picture elements as shown in FIG. 15. One of the element light beams forms six vertically juxtaposed arrays of the 800 horizontal picture elements. The inclination angles of the element mirrors 11b–g are determined to keep vertical distances P1–P5 between vertically juxtaposed arrays of the 800 horizontal picture elements formed by the one of the element light beams equal to each other, and a vertical distance P6 between the horizontal picture elements adjacent to each other formed respectively by the element light beams adjacent to each other vertically in the light beam projector 6 equal to the vertical distances P1–P5 between the vertically juxtaposed arrays of the 800 horizontal picture elements formed by the one of the element light beams. Therefore, a number of the element light beams to be arranged vertically along the imaginary substantially straight line in the light beam projector 6 and a number of the LED light sets as the claimed light sources to form the 600 vertical arrays of the 800 horizontal picture elements may be 100. Since the inclination angle of the polygon mirror 11 changes gradually, the 600 vertical arrays L-1–L-600 of the 800 horizontal picture elements are inclined relative to the horizontal direction, as shown in FIG. 16.

Third embodiment

Figure 17:
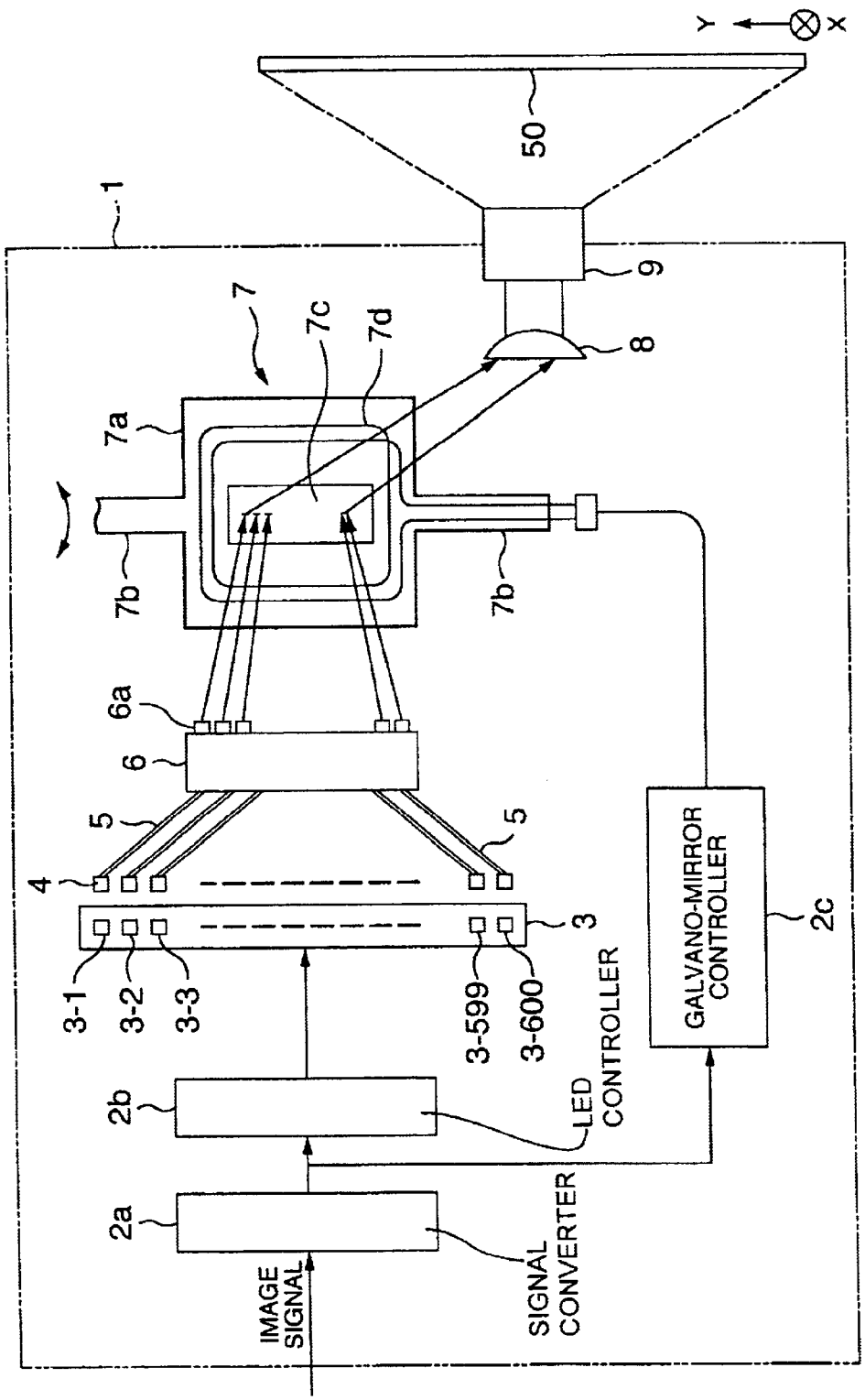
FIG. 17 is a schematic view showing main elements of another image projector as a third embodiment of the invention.
Figure 18:
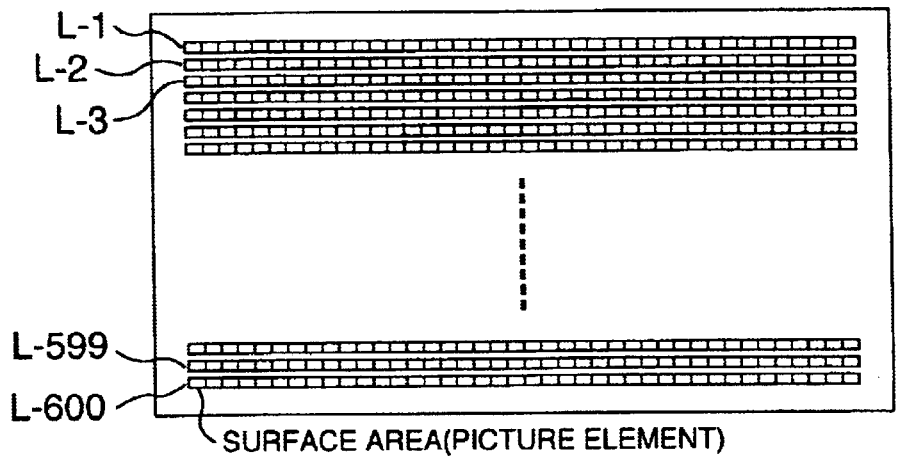
FIG. 18 is a schematic view showing a visible image formed by changing a horizontal position of surface areas on the object which surface areas are irradiated by respective element light beams.

The polygon mirror 7 may be replaced by a galvano mirror 7 as shown in FIG. 17. The galvano mirror 7 includes a silicon substrate 7a, a mirror 7c held on the silicon substrate 7a, a torsion bar 7b supporting the silicon substrate 7a, and an electromagnetic coil 7d around the mirror 7c. By energizing electrically the electromagnetic coil 7d in a magnetic field to generate a torque of Lorentz force, the mirror 7c swings reciprocally in a desired one of rotational directions opposite to each other, so that the proceeding direction projected from the light beam projector 6 to the galvano mirror 7 can be desirably changed to form the 800 horizontal picture elements in each of the 600 vertical arrays of the 800 horizontal picture elements as shown in FIG. 18.

In NTSC image scanning system, the 800 horizontal picture elements is formed within 52.7 mmsec and the formation of the 800 horizontal picture elements is restarted within 10.8 mmsec after the previous formation of the 800 horizontal picture elements. For forming the 800 horizontal picture elements by 60 times per each second, the galvano mirror 7 needs to oscillate at at least about 176.4 Hz (a half oscillation period of 2.83 mmsec for returning its initial position for starting the formation of the 800 horizontal picture elements after the previous formation of the 800 horizontal picture elements) and to oscillate at at least about 36.2 Hz (a half oscillation period of 2.83 mmsec for the formation of the 800 horizontal picture elements), and the at least one of color and luminous intensity of the element light beam needs to change at at least about 58 kHz (48 kHz*63.5/52.7). For obtaining both of the oscillations at about 176.4 Hz and 36.2 Hz in each oscillation, the controller 2c controls the energizing of the electromagnetic coil 7d.

Figure 19C:
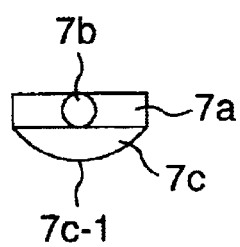
FIG. 19c is a cross sectional view of the galvano mirror of FIG. 18 taken along an imaginary plane including the swing axis thereof.
Figure 19A:
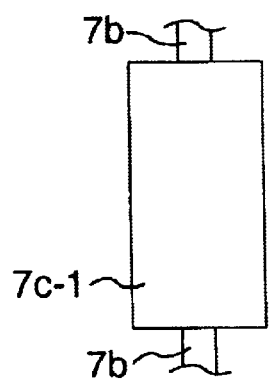
FIG. 19a is a front view of a galvano mirror of FIG. 18.
Figure 19B:
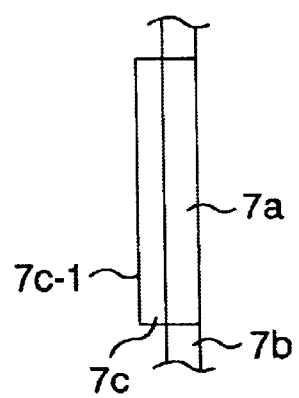
FIG. 19b is a cross sectional view of the galvano mirror of FIG. 18 taken along an imaginary plane perpendicular to a swing axis thereof.
Figure 20:
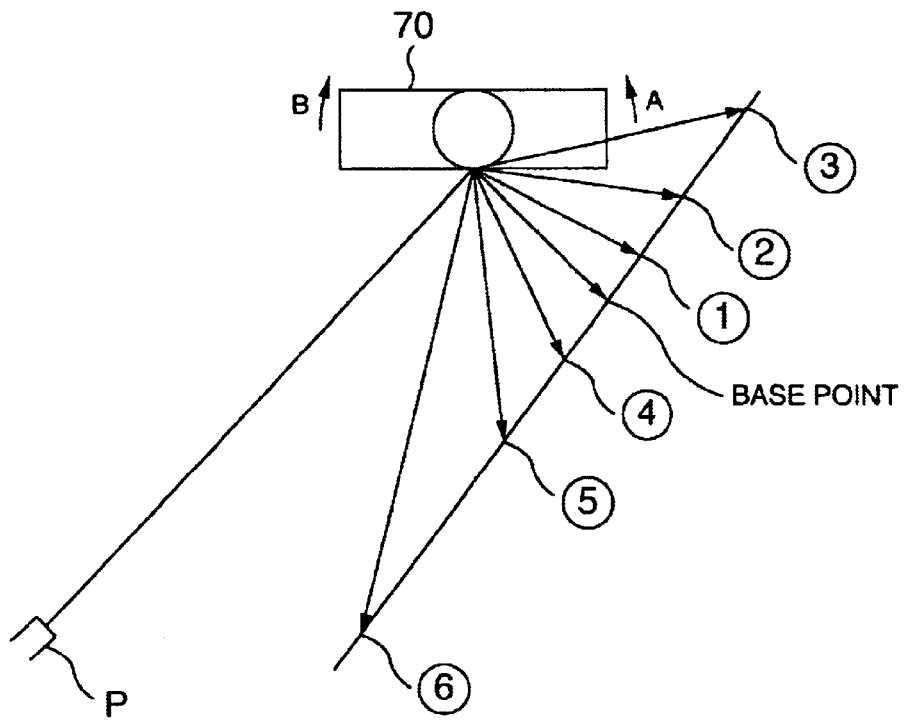
FIG. 20 is a schematic view showing a relation between a rotational position of the galvano mirror and a position of a surface area irradiated by the light beam.
Figure 21:
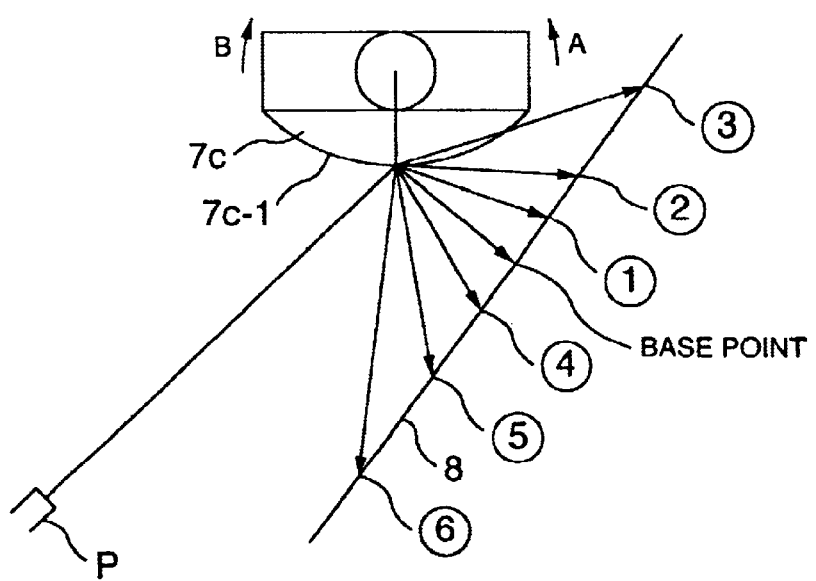
FIG. 21 is a schematic view showing another relation between a rotational position of the galvano mirror and a position of a surface area irradiated by the light beam.
Figure 22A:
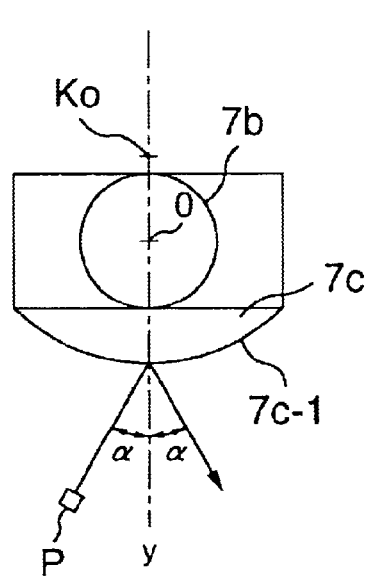
FIGS. 22a–22d are schematic views each showing a relationship between a rotational position of the galvano mirror and a reflection angle of the light beam on the galvano mirror.
Figure 22B:
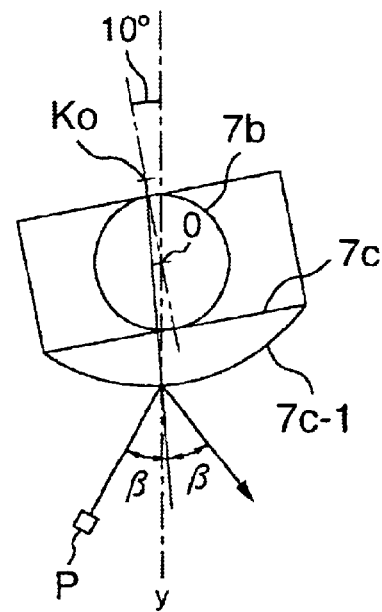
Figure 22C:
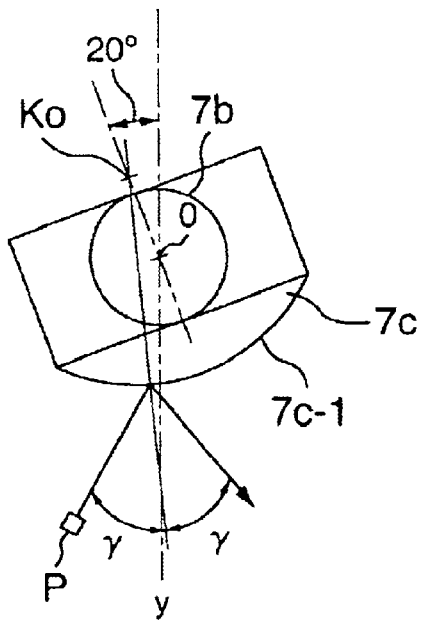
Figure 22D:
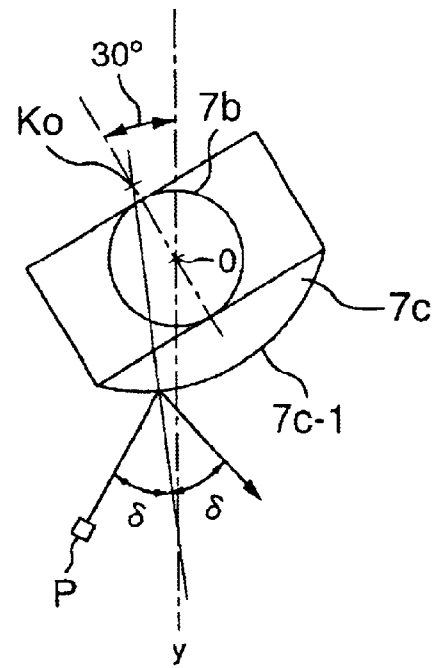

As shown in FIGS. 19a–c, the mirror 7c may have a convex mirror surface 7c-1 whose radius of curvature on an imaginary plane perpendicular to the torsion bar 7b is constant. By the convex mirror surface 7c-1, under a fixed angular motion range of the mirror as the deflector, positional distribution total-width and interval of the surface area irradiated by the light beam or element light beam ignited at a fixed time interval is made smaller and more constant in comparison with the a planer surface mirror as shown in FIGS. 20 and 21, so that the visible image correctly corresponding to the light beam or element light beams projected from the light beam projector 6 is finely formed on the object, and a size of the distortion compensating lens 8 may be decreased.

As shown in FIGS. 22a–d wherein Ko denotes a curvature radius center of the convex mirror surface 7c-1 and O denotes a rotational center of the mirror 7c, a variation of an angle between the proceeding directions of the light beam or element light beams around a reflection point at which the light beam or element light beam impinges against the mirror 7c and reflected toward the object according to the rotation of the mirror 7c is made small by the convex mirror surface 7c-1. The shape of the convex mirror surface 7c-1 may be adjusted to make the positional distribution interval of the surface area irradiated by the light beam or element light beam ignited at the fixed time interval correctly constant so that the distortion compensating lens 8 can be deleted.

As shown in FIG. 23, a galvano mirror 10 swingable to deflect the light beam or element light beams in two dimensions or directions perpendicular to each other may be used. The galvano mirror 10 includes a first silicon substrate 10b supported by a pair of first torsion bars 10a for deflecting the light beam or element light beams vertically, that is, the direction substantially parallel to the imaginary substantially straight line, and a second silicon substrate 11d supported on the first silicon substrate 10b through a pair of second torsion bars 10c for deflecting the light beam or element light beams horizontally, that is, the direction substantially perpendicular to the imaginary substantially straight line. A mirror 10e is fixed onto the second silicon substrate 10d. In a magnetic field, a coil 10b-1 on the first silicon substrate 10b and a coil 10d-1 on the second silicon substrate 10d are energized by the controller 2c to rotationally drive the first silicon substrate 10b and the second silicon substrate 10d respectively so that the light beam or element light beam is deflected in the directions perpendicular to each other.

Figure 24:
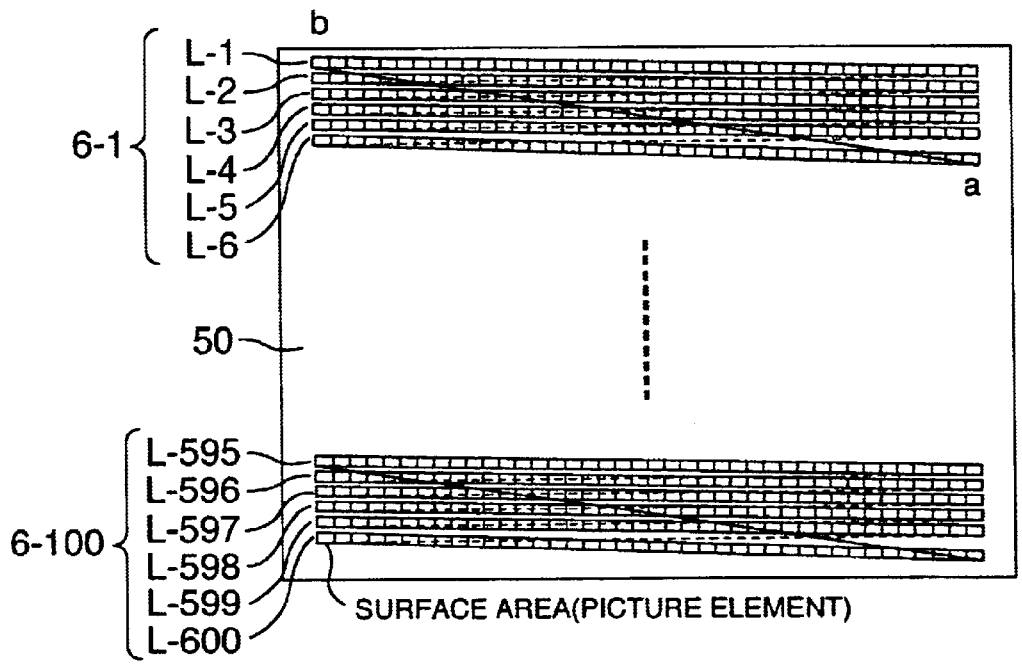
FIG. 24 is a schematic view showing a visible image formed by changing horizontal and vertical positions of surface areas on the object which surface areas are irradiated by respective element light beams.

In NTSC image scanning system, the 800 horizontal picture elements is formed within 52.7 mmsec and the formation of the 800 horizontal picture elements is restarted within 10.8 mmsec after the previous formation of the 800 horizontal picture elements. If the galvano mirror 10 for deflecting the light beam or element light beam vertically forms six vertical arrays (for example, L-1–L-6) of the 800 horizontal picture elements as shown in FIG. 24, for forming the 800 horizontal picture elements by 60 times per each second, the galvano mirror 10 needs to oscillate horizontally at at least about 1053 Hz (a half oscillation period of 0.47 mmsec (1000/(60*6)*(10.8/63.5)) for returning its initial position for starting the formation of the 800 horizontal picture elements after the previous formation of the 800 horizontal picture elements) and to oscillate horizontally at at least about 217 Hz (a half oscillation period of 2.31 mmsec (1000/(60*6)*(52.7/63.5)) for the formation of the 800 horizontal picture elements in each vertical array of the 800 horizontal picture elements). The light beam or element light beam should return from the latest position b of the horizontally latest formed picture element of the vertically lowest array of the 800 horizontal picture elements to the initial position a of the horizontally initially formed picture element of the vertically highest array of the 800 horizontal picture elements within the half oscillation period of 0.47 mmsec (1053 Hz) for returning the initial position for starting the formation of the 800 horizontal picture elements after the previous formation of the 800 horizontal picture elements in each of the sequentially formed vertical six arrays of the 800 horizontal picture elements, and for forming the vertical six arrays of the 800 horizontal picture elements by 60 times per each second, the galvano mirror 10 needs to oscillate vertically at at least about 31 Hz (a half oscillation period of 16.20 mmsec (1000/(60*6)*5+2.31).

Figure 25C:
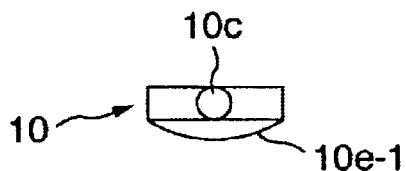
FIG. 25c is a cross sectional view of the galvano mirror of FIG. 23 taken along an imaginary plane including the swing axis thereof.
Figure 25A:
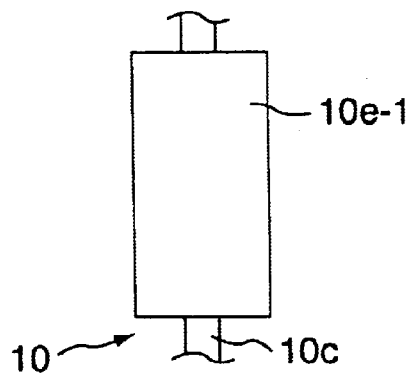
FIG. 25a is a front view of a galvano mirror of FIG. 23.
Figure 25B:
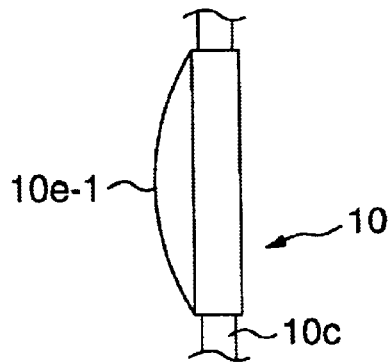
FIG. 25b is a cross sectional view of the galvano mirror of FIG. 23 taken along an imaginary plane perpendicular to a swing axis thereof.

As shown in FIGS. 25a–c, the mirror 10 may have a semi-spherical mirror surface 10e-1. By the semi-spherical mirror surface 10e-1, under a fixed angular motion range of the mirror as the deflector, positional distribution total-width and interval of the surface area irradiated by the light beam or element light beam ignited at a fixed time interval is made smaller and more constant in comparison with the a planer surface mirror as shown in FIGS. 20 and 21, so that the visible image correctly corresponding to the light beam or element light beams projected from the light beam projector 6 is finely formed on the object, a size of the distortion compensating lens 8 may be decreased, and the positional distribution interval of the surface area irradiated by the light beam or element light beam ignited at the fixed time interval correctly is made constant to delete the distortion compensating lens 8.

What is claimed is:

1. An image projector for forming a visible image on an object, said image projector comprising:
    a light beam projector that projects two light beams; and
    a deflector that changes frequently a proceeding direction in which the projected light beams proceed so as to change rapidly and repeatedly positions of first and second surface areas on the object, that are irradiated simultaneously by the projected light beams and that are spaced apart from one another, to form the visible image on the object, whereby
    the two light beams are arranged as staggered relative to an imaginary substantially straight line as seen in the proceeding direction so that the resultant light beam formed by the two beams together is long-and-narrow shaped as seen in the proceeding direction to irradiate simultaneously the surface areas spaced apart from each other along the imaginary substantially straight line on the object as seen in the proceeding direction.

2. An image projector for forming a visible image on an object, comprising:
    a light beam projector that projects a light beam; and
    a deflector that changes frequently a direction in which the projected light beam proceeds so as to change a position of a surface area on the object that is irradiated by the projected light beam, wherein:
        the position of the surface area on the object irradiated by the projected light beam is moved rapidly and repeatedly to form the visible image on the object,
        the deflector includes a rotatable mirror arranged to receive the light beam and change frequently the direction in which the light beam proceeds,
        the rotatable mirror is swingable in directions opposite to each other to reciprocate circumferentially,
        the light beam is prevented from being projected toward the object when the rotatable mirror is swung in one of the directions opposite to each other, and
        the light beam is projected toward the object when the rotatable mirror is swung in another one of the directions opposite to each other.

3. An image projector for forming a visible image on an object, said image projector comprising:
    a light beam projector that projects a light beam; and
    a deflector that changes frequently a proceeding direction in which the projected light beam proceeds to change a position of a surface area on the object which surface area is to be irradiated by the projected light beam so that the irradiated surface area is moved rapidly and repeatedly over the object to form the visible image on the object, wherein:
        the light beam includes at least two element light beams for respectively irradiating simultaneously the surface areas apart from each other; and
        the element light beams are arranged as staggered relative to an imaginary substantially straight line as seen in the proceeding direction so that the light beam is long-and-narrow shaped as seen in the proceeding direction to irradiate simultaneously the surface areas apart from each other along the imaginary substantially straight line on the object as seen in the proceeding direction.

\* \* \* \* \*